United States Patent [19]
Yao et al.

[11] Patent Number: 6,097,176
[45] Date of Patent: Aug. 1, 2000

[54] METHOD FOR MANAGING BACK-UP POWER SOURCE

[75] Inventors: Takeshi Yao, Fujisawa; Hideki Kasahara; Tatsuhiko Suzuki, both of Kamakura; Motohide Masui, Chigasaki; Hajime Konishi, Ikoma, all of Japan

[73] Assignee: Matsushita Electric Industrial Co., Ltd., Osaka-fu, Japan

[21] Appl. No.: 09/205,404

[22] Filed: Dec. 3, 1998

[30] Foreign Application Priority Data

| Dec. 3, 1997 | [JP] | Japan | 9-332612 |
| Dec. 26, 1997 | [JP] | Japan | 9-359609 |
| May 19, 1998 | [JP] | Japan | 10-136384 |
| May 19, 1998 | [JP] | Japan | 10-136385 |
| Sep. 1, 1998 | [JP] | Japan | 10-246786 |
| Sep. 7, 1998 | [JP] | Japan | 10-252406 |

[51] Int. Cl.⁷ .................... H02J 7/00; H02J 7/14
[52] U.S. Cl. .................... 320/132; 320/150; 320/144; 320/139
[58] Field of Search .................... 320/150, 144, 320/139, 132

[56] References Cited

U.S. PATENT DOCUMENTS

| 5,459,671 | 10/1995 | Duley | 702/63 |
| 5,539,298 | 7/1996 | Perkins et al. | 320/139 |
| 5,563,496 | 10/1996 | McClure | 320/128 |
| 5,572,110 | 11/1996 | Dunstan | 320/106 |
| 5,666,039 | 9/1997 | Odaohara | 320/152 |
| 5,736,834 | 4/1998 | Kuno | 320/146 |

FOREIGN PATENT DOCUMENTS

| 07043438 | 2/1995 | Japan . |
| 08078065 | 3/1996 | Japan . |
| 09117074 | 5/1997 | Japan . |

OTHER PUBLICATIONS

"Proceedings of the 1997 Communications Society Conference of IEICE", *The Institute of Electronics, Information And Communication Engineers* pp. 531 Sep. 3–6, 1997.

*Primary Examiner*—Shawn Riley
*Assistant Examiner*—Gregory J. Toatley, Jr.
*Attorney, Agent, or Firm*—Akin, Gump, Strauss, Hauer & Feld, L.L.P.

[57] ABSTRACT

A method for managing a back-up power source capable of maintaining the discharge capacity of a nickel metal-hydride storage battery for a long-term at a low cost, and is suitable for the management of the back-up power source for the guidance lights, the emergency lights, the information telecommunication systems, and the like is disclosed. The present invention provides a method for managing the back-up power source which uses a nickel metal-hydride storage battery including a positive electrode mainly consisting of nickel oxide, a negative electrode mainly consisting of a hydrogen storage alloy, a separator and an alkaline electrolyte, wherein an intermittent charge is performed on the nickel-metal hydride storage battery, comprising: calculating a self-discharge quantity of the nickel-metal hydride storage battery during idle period of the intermittent charge on the basis of a temperature of the nickel-metal hydride storage battery at the idling; and controlling the charging of the nickel-metal hydride storage battery on the basis of the obtained self-discharge quantities.

4 Claims, 13 Drawing Sheets

METHOD FOR MANAGING BACK-UP POWER SOURCE

BACKGROUND OF THE INVENTION

The present invention relates to a method for managing back-up power sources for a guidance light (taxing guidance light), an emergency light, an information telecommunication system, and the like, especially to a method for charging and a method for determining a degree in deterioration of nickel metal-hydride storage batteries used in the back-up power sources.

Nickel metal-hydride storage batteries which use hydrogen storage alloys capable of absorbing and desorbing hydrogen in a reversible manner have been utilized as power sources for cordless appliances such as telecommunication apparatuses, computers, video recording apparatuses and the like, in place of the nickel-cadmium batteries, since they can be sealed and have a higher energy density than the nickel-cadmium storage batteries.

In recent years, there is a demand for using the nickel-metal hydride storage batteries in the back-up power sources for the guidance lights, the emergency lights, the information telecommunication systems and the like, where the nickel-cadmium storage batteries had since been used, in order to design the smaller-sized appliances and to decrease a harmful influence to the environment.

Since the back-up power sources are usually provided as substitute power sources for emergency, they are required to constantly maintain satisfactory discharge capacities. There, has however been no method for charging the nickel-metal hydride storage batteries suitable for the application of the back-up power source. Therefore, they have not been widely utilized as back-up power sources.

In the conventional back-up power sources using the nickel-cadmium storage batteries, trickle charging in which the batteries are constantly supplied with minute charging currents has been employed.

When the nickel-metal hydride storage batteries are subjected to the trickle charge, the storage capacities of the batteries decrease and the batteries can not maintain a satisfactory discharge capacity. Such decrease in battery capacities is due to the proceedings of oxidation of the hydrogen storage alloy contained in the negative electrodes, facilitated by bringing the batteries into the overcharged state during the trickle charge. That is, the oxidation of the hydrogen storage alloy causes an increase in internal resistance of the batteries due to the decrease in hydrogen storaging ability of the alloy and consumption of the electrolyte.

A suitable charging method for charging back-up power sources having nickel-metal hydride storage batteries, using an intermittent charge method has been proposed in, for instance, Japanese Unexamined Patent Publication No. Hei 9-117074 or Proceedings of the 1997 communications society conference of IEICE (Proceedings II, page 531). The intermittent charge method is a method of maintaining a battery in a nearly fully-charged state by charging the battery intermittently to compensate for the self-discharge quantity of the battery during the last idle period or the last quiescence in the charging.

According to the proposal, the charge is performed while measuring a voltage of the battery and stopped when the battery voltage reaches a maximum threshold value, and resumed when the battery voltage drops to a minimum threshold value during the idle period.

Since such charge control systems are however required to constantly monitor the battery voltage, the charge control system becomes inevitably expensive. It is difficult to utilize such control systems for guidance lights, emergency lights, information telecommunication systems and the like which have limited manufacturing and operating costs.

In addition, when the internal resistance of the battery rises, for example, and the battery is near the end of its life cycle, the battery voltage does not drop to the predetermined value and the charge is not resumed even if the self-discharge quantity of the battery reaches the predetermined value.

With back-up power sources for computers and information telecommunication systems, a battery management unit (BMU) is usually used. The BMU has the function of determining the remaining servicable period of the battery by detecting the remaining discharge capacity of the battery, and also has the function of determining the remaining life period of the battery by detecting the deterioration of the battery. The BMU is expensive due to its structure. Therefore, the BMU can be applied to the back-up power sources for the computers, but can hardly be applied to guidance lights, emergency lights, information telecommunication systems and the like, where manufacturing and maintaining costs are high.

In the above-mentioned prior art, there is disclosed a method for detecting the value of the voltage drop after the idle period, i.e., the drop of the battery voltage during a predetermined period after the stop of the charging, for determining the degree in deterioration of the battery. According to this method, when the charging is performed at a small current, the voltage drop value itself is small because the voltage is also small. It is therefore difficult to detect the voltage of the battery and to determine the degree in deterioration thereof with a high accuracy.

The primary object of the present invention is to solve the above-mentioned problems and to provide a method for managing the back-up power source for nickel metal-hydride storage batteries which is capable of maintaining the discharge capacity of the batteries for a long time and is suitable for back-up power sources for guidance lights, the emergency lights, the information telecommunication systems and the like.

SUMMARY OF THE INVENTION

According to the present invention, while performing an intermittent charge on the nickel-metal hydride storage battery, the self-discharge quantity during the idle period is corrected based on a temperature. The self-discharge quantity obtained by the correction is compensated during the subsequent charging. During the subsequent charging, the battery is charged so as to compensate the self-discharge quantity obtained by the correction.

The present invention provides a method for managing the back-up power source which uses a nickel metal-hydride storage battery including a positive electrode mainly consisting of nickel oxide, a negative electrode mainly consisting of a hydrogen storage alloy, a separator and an alkaline electrolyte, wherein an intermittent charge is performed on the nickel-metal hydride storage battery, comprising the steps of:

calculating a self-discharge quantity of the nickel-metal hydride storage battery during an idle period of the intermittent charge, on the basis of a temperature of the nickel-metal hydride storage battery at the idling; and controlling the charging of the nickel-metal hydride storage battery, on the basis of the obtained self-discharge quantities.

According to the above-mentioned charge control, it is possible to prevent the battery from being overcharged and to suppress deterioration, by charging the battery with the calculated self-discharge quantity of electricity.

In the above-mentioned method, it is not necessary to utilize the temperature of the nickel-metal hydride storage battery itself, as atmospheric temperature can be used.

In a preferred mode of the present invention, a subsequent charge period is determined based on the calculated self-discharge quantity during a given idle period in the intermittent charge.

Alternatively, the charging on the nickel-metal hydride storage battery is resumed when the calculated self-discharge quantity reaches a predetermined value, for instance, 10% to 30% of the battery capacity.

In another preferred mode of the present invention, the self-discharge quantity of the above-mentioned nickel metal-hydride storage battery in the idle period is calculated on the basis of the average temperature of the nickel metal-hydride storage battery during the given period. When the calculated self-discharge quantity does not reach the predetermined value, the idling is further continued for another given period and the self-discharge quantity is again calculated. After the calculation, the accumulated value of the self-discharge quantities is compared with the predetermined value to determine when to stop idling.

As previously described, as the self-discharge quantity for every given period (for, instance, from 3 to 48 hours), and the value of the quantity reaches the predetermined value, the charge is resumed. The charging current, at that time, is for instance, 1/30 C to 1 C.

According to this method, it is possible to determine the self-discharge quantity during the idle period. Further, it is possible to calibrate the self-discharge quantity as atmospheric temperature. Therefore, it is possible to control the charging with higher accuracy.

The present invention further provides a method for managing the back-up power source which uses a nickel metal-hydride storage battery including a positive electrode mainly consisting of nickel oxide, a negative electrode mainly consisting of a hydrogen storage alloy, a separator and an alkaline electrolyte, wherein an intermittent charge is performed on said nickel-metal hydride storage battery at a charging current of 0.2 C to 1 C, while detecting a fully charged-state by a −Δ control or a dT/dt control.

When of charging the battery in compliance with a the so-called timer control using a constant charging period, there is no concern about overcharging or insufficient charging because self-discharge quantity during the idle period is constant. However, if the atmospheric temperature varies, the self-discharge quantity also varies. Therefore, there is a possibility of overcharging the battery under the timer control, which makes the cycle life of the battery shorter. Under the circumstance, in order to securely charge the battery up to the fully charged state while preventing the overcharging, the above-mentioned intermittent charge is performed while detecting the fully charged-state by means of −ΔV control or dT/dt control.

The −ΔV control system utilizes the characteristics of the battery when charging the battery at a constant current, typically the battery voltage rises with charging and falls gradually when it reaches the fully charged state. The voltage drop value (−ΔV) at that time is detected and utilized to the charge control.

The dT/dt control involves rising the gradient (dT/dt) of the battery temperature and using it to control charging.

In order to securely maintain a remaining discharge capacity at the time of using the battery for the back-up purpose, it is preferable to resume the charge when the battery voltage drops to a predetermined value, while detecting the battery voltage during the idling.

In order to further simplify the charge control, it is preferable to periodically resume the charging by means of timer control with a given interval (for instance, 1 to 7 days).

The present invention further provides a method for managing the back-up power source which uses a nickel metal-hydride storage battery including a positive electrode mainly consisting of nickel oxide, a negative electrode mainly consisting of a hydrogen storage alloy, a separator and an alkaline electrolyte, wherein an intermittent charge is performed on the nickel-metal hydride storage battery, and a degree in deterioration of the nickel metal-hydride storage battery is determined on the basis of an atmospheric temperature at the start of charging and the battery voltage at the end of the charging.

The present invention further provides a method for managing the back-up power source which uses a nickel metal-hydride storage battery including a positive electrode mainly consisting of nickel oxide, a negative electrode mainly consisting of a hydrogen storage alloy, a separator and an alkaline electrolyte, wherein an intermittent charge is performed on the nickel-metal hydride storage battery, and a degree in deterioration of the nickel metal-hydride storage battery is determined on the basis of the surface temperature and the battery voltage at charging.

Since the charging current of a battery depends on the internal resistance of the battery and the charging current, it is possible to determine the degree in deterioration of the battery, irrespective of the value of the charging current, according to this method.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Figure 1:
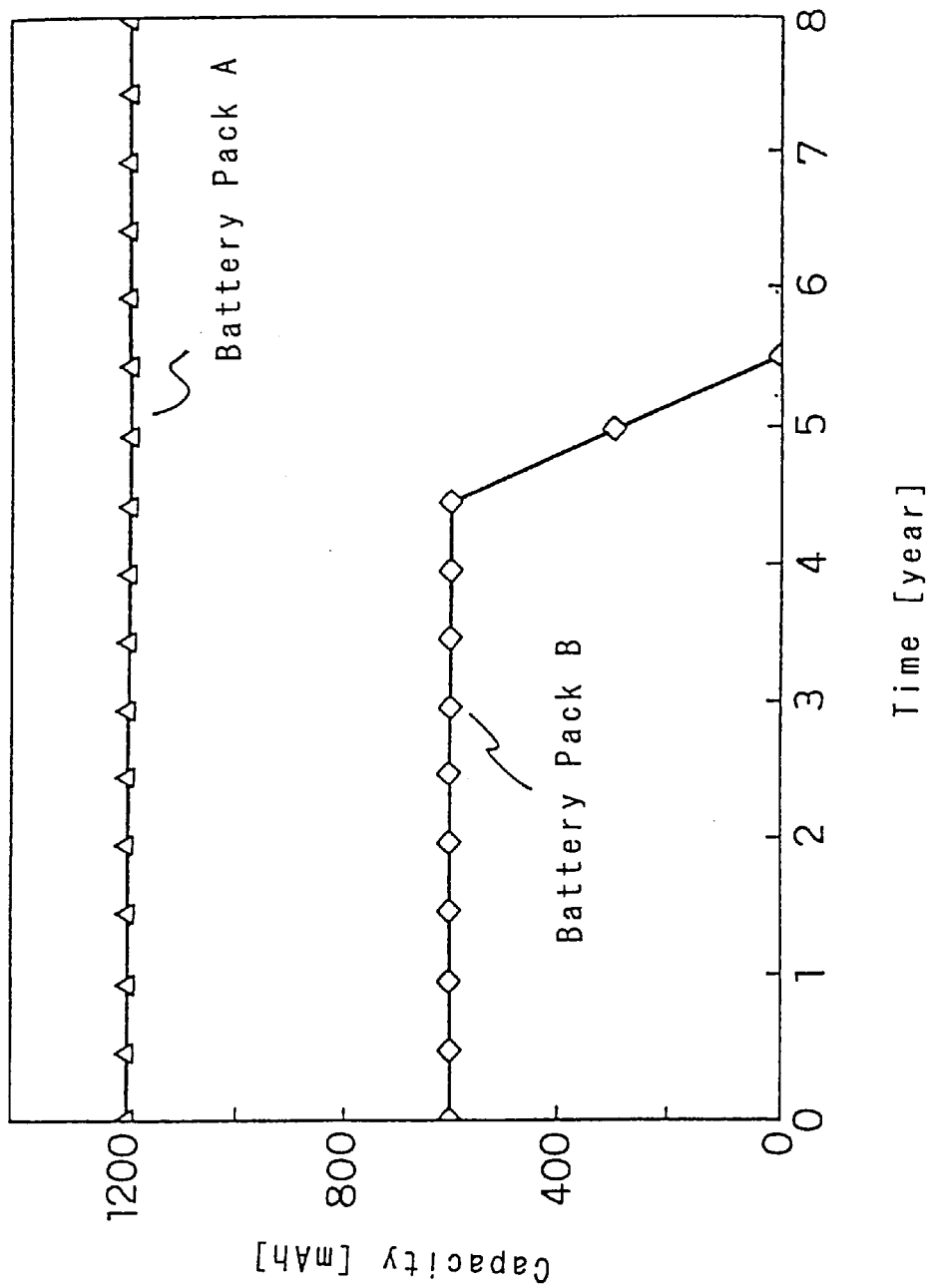
FIG. 1 is a characteristic diagram showing the changes in the battery discharge capacities obtained by performing an intermittent charge on a nickel-metal hydride storage battery and on a nickel-cadmium storage battery in an example of the present invention.

In the following paragraphs, methods of charging batteries and of methods for determining the degree in the deterioration of batteries will be described in detail as preferred embodiments of the present invention.

EXAMPLE 1

To produce a nickel metal-hydride storage battery, a paste consisting mainly of a nickel hydroxide powder and a cobalt compound as a conductive agent was prepared. Then, the obtained paste was filled in a substrate of foamed nickel. The substrate filled with the paste was pressed to have a predetermined thickness and cut into a size for a battery of AA size, to produce a positive electrode plate.

On the other hand, a paste consisting mainly of a hydrogen storage alloy powder was applied on both side faces of a perforated Ni-plated steel sheet. The Ni-plated steel sheet was pressed and cut into a predetermined size, to produce a negative electrode plate.

The obtained positive and negative electrodes are laminated from each other via a separator of made a polypropylene nonwoven fabric interposed therebetween. Then, the laminated sheets were wound up together in a spiral fashion, to produce an electrode group. The obtained electrode group was inserted into an exterior can, and a predetermined amount of an alkaline electrolyte prepared by dissolving lithium hydroxide in an aqueous solution of KOH having a specific gravity of 1.30, at 30 g/L was also injected into the exterior can. The can was stood still at an atmospheric temperature of 25° C. for 12 hours and then subjected to an initial charge/discharge (charging at a current of 0.1 C for 15 hours, and discharging at a current of 0.2 C for 4 hours), thereby to produce a nickel-metal hydride storage battery of AA size having a nominal discharge capacity of 1200 mAh.

By connecting six pieces of the obtained nickel-metal hydride storage batteries in series, a battery pack was assembled. This was named as Battery Pack "A".

On the other hand, by connecting six pieces of nickel-cadmium storage batteries with a nominal discharge capacity of 600 mAh in series, another battery pack was assembled. This was named as Battery Pack "B".

Battery Packs "A" and "B" obtained in the above-mentioned manner were subjected to an intermittent charge of the following mode at an atmosphere of 25° C. When the battery voltage dropped to the predetermined voltage value (1.3 V/cell) during an idle period, charging with a timer control was restored. In consideration of the self-discharge quantity of the battery packs (about 20% of the nominal battery discharge capacity) and of the charge efficiency in the charging, the battery packs were charged at a charging current of ½ CmA for 30 minutes so that their charging quantities are about 25% of the nominal discharge capacity.

While repeating the above-mentioned intermittent charge, the battery packs were discharged till the voltage per one cell dropped to 1.0 V for every 6 month, thereby to derive the battery capacities from the discharge quantities at that time. The results thereof are shown in FIG. 1.

As clearly shown in FIG. 1, the discharge capacity of Battery Pack "A" with the nickel-metal hydride storage batteries hardly decreases. By contrast, the discharge capacity of Battery Pack "B" with the nickel-cadmium storage batteries greatly decreases with the repetition of the intermittent charge.

Next, Battery Packs "A" and "B" were each subjected to a trickle charge under an atmosphere of 25° C. at a charging current of 1/20 CmA in compliance with a typical charging condition for the nickel-cadmium storage battery for back-up applications.

Each of Battery Packs "A" and "B" was discharged till the voltage per one cell dropped to 1.0 V for every 6 months, to derive the battery discharge capacity from the discharge quantity at that time. The changes in the battery discharge capacity of Battery Packs "A" and "B" are shown in FIG. 2.

Figure 2:
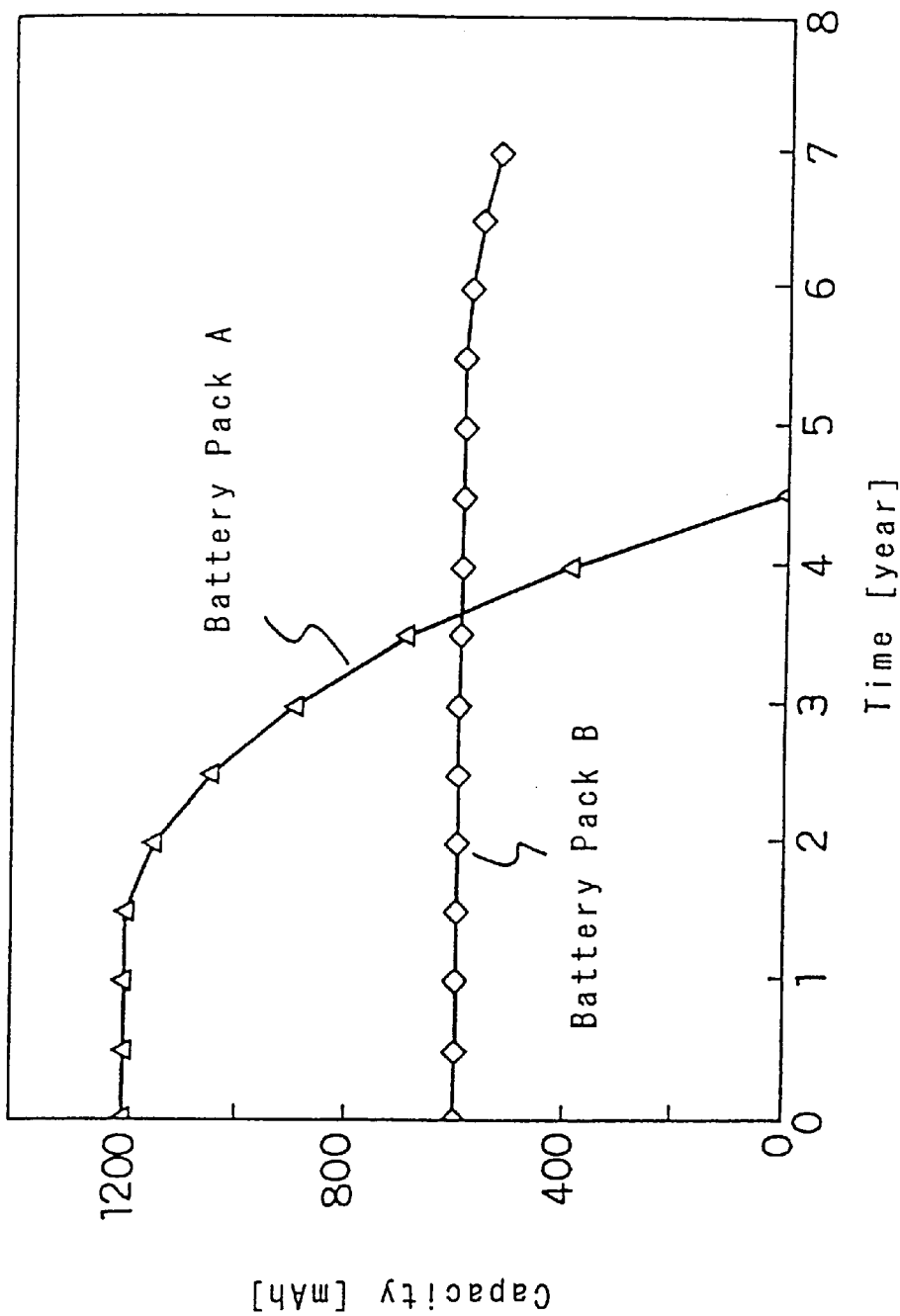
FIG. 2 is a characteristic diagram showing the changes in the battery discharge capacities obtained by performing a trickle charge on a nickel-metal hydride storage battery and on a nickel-cadmium storage battery in the same example.

As clearly shown from FIG. 1 and FIG. 2, the discharge capacity of the nickel-metal hydride storage battery can be maintained for a long-term by the intermittent charge. According to the intermittent charge, the overcharged quantity of electricity and the amount of the oxygen generated in proportion to the overcharged quantity can be suppressed to about 1/40 of these amounts by the trickle charge. It is therefore believed that an oxidation of the hydrogen storage alloy can be suppressed accordingly and an amount of the electrolyte hardly decreases.

In contrast to this, the nickel-metal hydride storage battery can not maintain the discharge capacity for a long-term by the trickle charge. As a result of an analysis on the deteriorated nickel-metal hydride storage battery, it is clarified that a decrease in discharge capacity is caused by:

(1) a decrease in hydrogen storing ability of the hydrogen storage alloy in the negative electrode due to an oxidation of the hydrogen storage alloy (the oxidation was facilitated by an oxygen gas generated continuously from the positive electrode during the trickle charge), and (2) an increase in internal resistance of the battery due to a decrease in amount of the electrolyte (the electrolyte was consumed at the oxidation of the hydrogen storage alloy).

By contrast, the nickel-cadmium storage battery demonstrates a large decrease in discharge capacity by the intermittent charge, while the decrease in discharge capacity is suppressed by the trickle charge. Repetition of charging and self-discharging, particularly a repetition of charging facilitates the formation and growth of dendrites of cadmium contained in the negative electrode of the battery, in comparison with continuously charging at minute currents.

Herein, according to the so-called timer control in which the charging is stopped for a given time period, the configuration of the apparatus can be simplified as compared with a method of controlling the charge/discharge while detecting the battery voltage. In addition, where the atmospheric temperature is stable, it is possible to control the charged quantity with high accuracy.

Using the timer control, there may be a case where the battery is not fully charged or overcharged due to the variance in atmospheric temperature the like, because only an estimated decrease in discharge capacity is compensated. In addition, where such control simply charges for a given period of time, the battery is not fully charged by the charging immediately after the actual service as the back-up power source or the discharge. It is therefore impossible to demonstrate a satisfactory function as the back-up power source for some time period after the discharge.

Under these circumstances, charging in accordance with a so-called $-\Delta V$ control is desirable in order to fully charge the battery more securely. The $-\Delta V$ control utilizes the characteristics of the battery under charging at a constant current in which the battery voltage rises toward a peak value until the battery reaches a fully charged state and falls gradually after reaching the fully charged state, and performs a charge control by detecting a value in a voltage drop $(-\Delta V)$ from the peak value. Therefore, according to the $-\Delta V$ control, it is possible to charge a battery up to a fully charged state while preventing overcharging. Herein, it is desirable to perform the charging at a current of $\frac{1}{5}$ C to 1 C, because the $-\Delta V$ value becomes hardly detectable at a high temperature in the case of charging at a smaller current under the $-\Delta V$ control.

Another charge control system for charging the battery until the fully charged state may be exemplified as a control system of detecting a rising gradient of the battery temperature (dT/dt) or a control system of detecting an upper limit (TCO) of the battery temperature.

As described above, with a use of nickel-metal hydride storage battery as the back-up power source, the intermittent charge is preferable.

EXAMPLE 2

As explained in Example 1, it is possible to suppress the overcharging or insufficient charging caused by a variance in atmospheric temperature, by setting a voltage value which corresponds to a given self-discharge quantity and by restoring the charging when the battery voltage drops to the mentioned voltage value during the idle period. However, the internal resistance of the battery rises when the life cycle of the battery is nearly over or due to other reasons, the voltage value does not however drop to the preset value even if the self-discharged quantity reaches the preset value, and the charging cannot sometime be restored. In this example, a charge control which stably operates irrespective of the internal resistance of the battery is described.

Battery Pack "A" with the nickel-metal hydride storage batteries similar to those used in Example 1, and Battery Pack "B" with the nickel-cadmium storage batteries were each subjected to an intermittent charge as follows.

A cycle of charging Battery Pack "A" and "B" at a current of $\frac{1}{2}$ CmA for 18 minutes and idling for 3 days was repeated.

Herein, the remaining capacity of the battery decreased as much as about 10% during a storing under an atmospheric temperature of 25° C. for the 3 days. The intent was to compensate for the remaining capacity decrease by the charging for 18 minutes. By fully discharging the battery until the battery voltage dropped to 1.0 V/cell every 6 months, the discharge capacity of the battery was derived.

Figure 3:
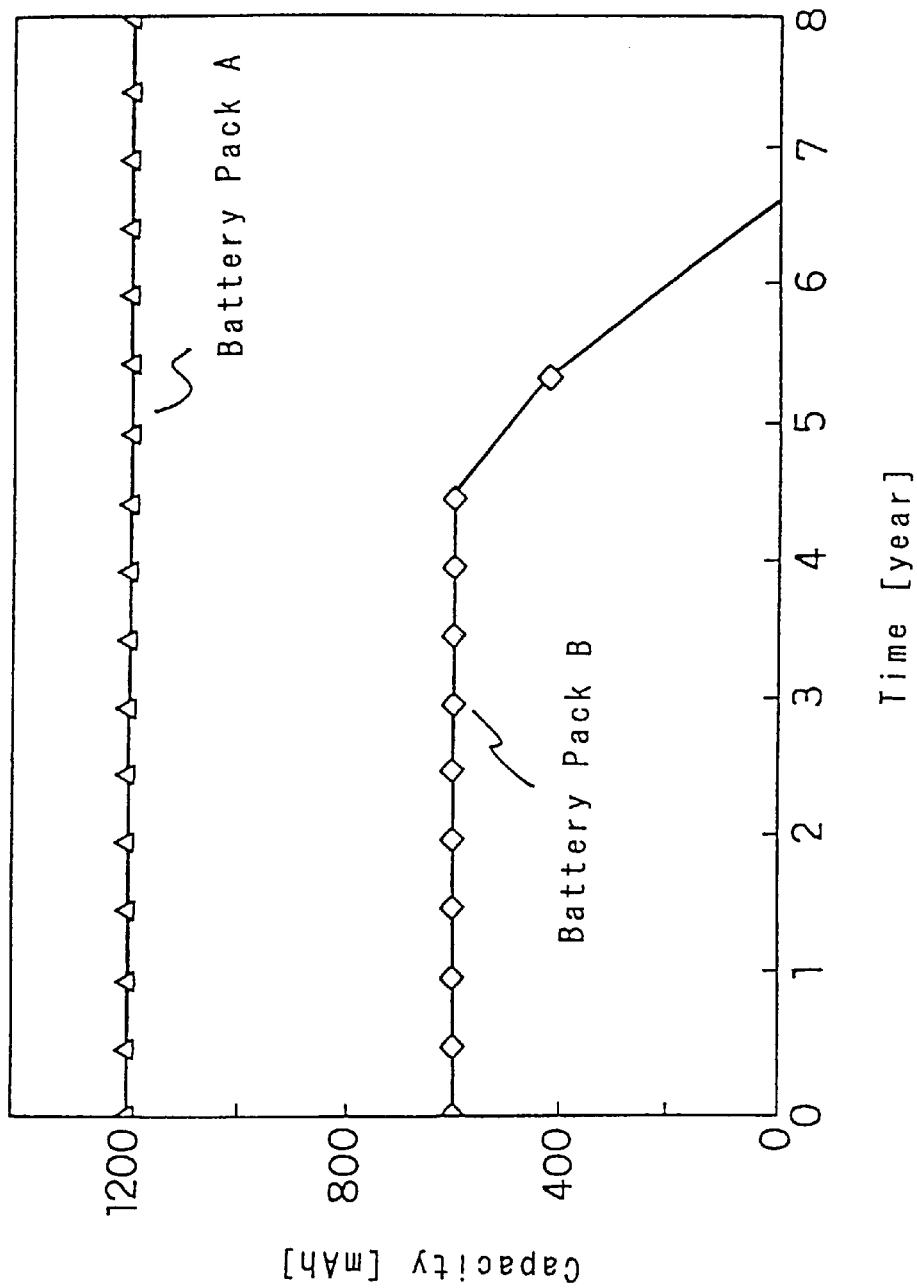
FIG. 3 is a characteristic diagram showing the changes in the battery discharge capacities obtained by performing an intermittent charge on a nickel-metal hydride storage battery and on a nickel-cadmium storage battery in another example of the present invention.

The changes in discharge capacities of those battery packs are shown in FIG. 3.

As clearly shown in FIG. 3, the discharge capacity of Battery Pack "B" greatly decrease whereas the discharge capacity of Battery Pack "A" hardly decrease for a long term.

According to the intermittent charge, the overcharge quantity and the amount of oxygen generated from the positive electrode by the overcharging are reduced to about $\frac{1}{24}$ of these by the trickle charge, and thus the oxidation/ deterioration of the hydrogen storage alloy contained in the negative electrode and the consumption of the electrolyte are suppressed. According to the intermittent charge, it is therefore possible to suppress the decrease in capacity of the nickel-metal hydride storage battery even long term.

It is considered that the great decrease in discharge capacity of Battery Pack "B" is due to an internal short-circuiting caused by a dendrite growth of cadmium contained in the negative electrode of the battery, invited by the repitation of charging and self-self-discharging.

EXAMPLE 3

A cycle of charging Battery Pack "A" and "B" at a current of $\frac{1}{10}$ CmA for 38 minutes and idling for 12 hours was repeated. Herein, the remaining capacity of the battery may decrease as much as about 4% during the storing under an atmospheric temperature of 25° C. for 12 hours. It was to charge the batteries to as much as 6% of the battery discharge. By fully discharging the battery until the battery voltage dropped to 1.0 V/cell for every 6 months, the discharge capacity of the battery was derived.

Figure 4:
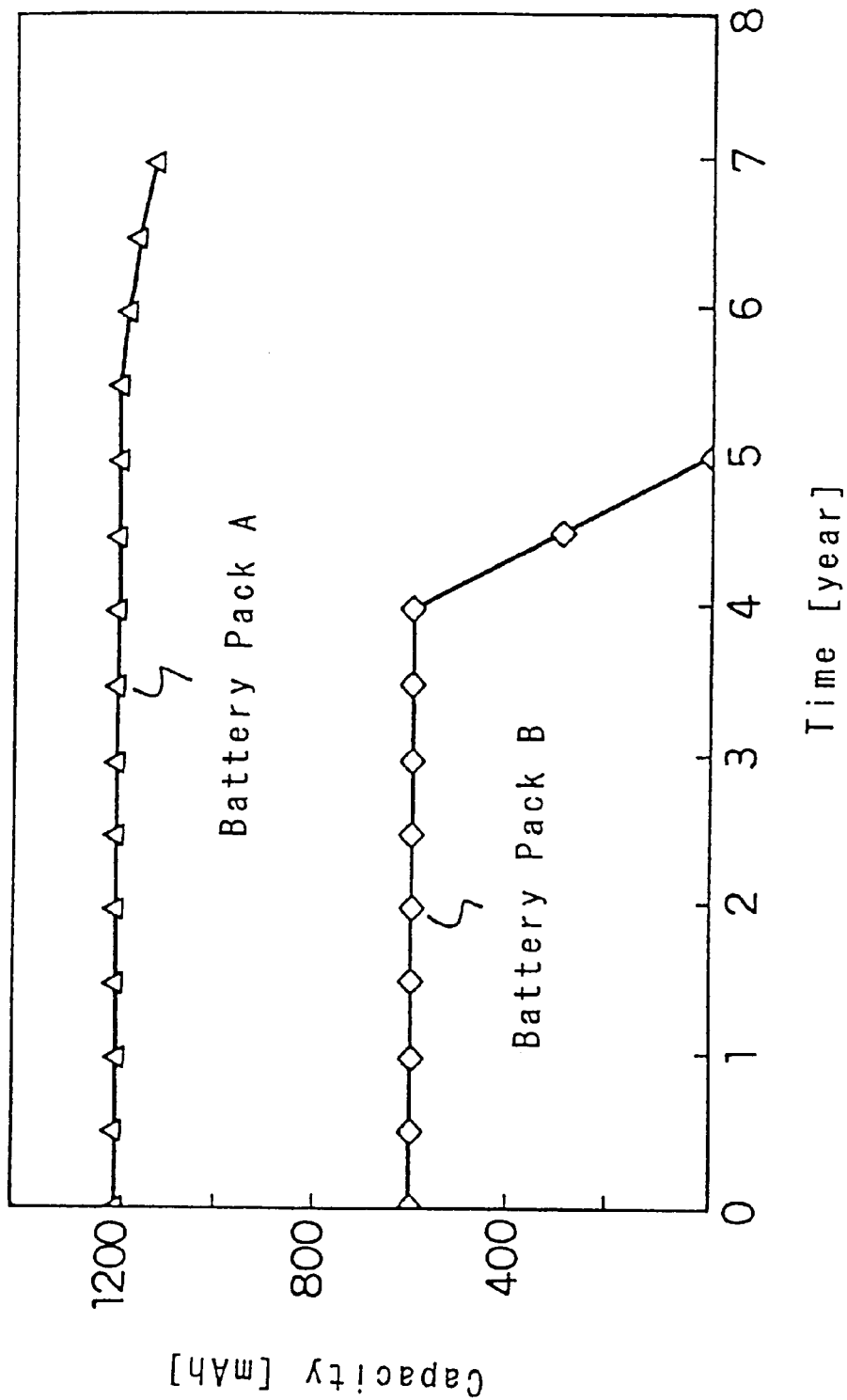
FIG. 4 is a characteristic diagram showing the changes in the battery discharge capacities obtained by intermittently charging a nickel-metal hydride storage battery and on a nickel-cadmium storage battery in another example of the present invention.

The changes in the discharge capacities are shown by the diagram in FIG. 4.

As clearly shown in FIG. 4, the capacity of Battery Pack "B" greatly decreases whereas the capacity of Battery Pack "A" hardly decreases for a long term.

According to the intermittent method, the overcharge quantity (or the amount of the generated oxygen) of Battery Pack "A" with the nickel-metal hydride storage batteries is reduced to about $\frac{1}{7}$ in comparison with the same battery pack subjected to the trickle charge. It is presumed that the reduction is due to a suppression of the deterioration of the hydrogen storage alloy contained in the negative electrode. It is also presumed that a dendrite of the cadmium used in the negative electrode was formed by the repetition of charge/discharge and invited an internal short-circuiting in Battery Pack "B" with the nickel-cadmium storage batteries.

EXAMPLE 4

Battery Packs "A" similar to those used in the foregoing examples was charged intermittently under the following charging conditions "A1" and "A2", respectively.

A1: A cycle of charging at a current of $\frac{1}{10}$ CmA under an atmospheric temperature of 0° C. for 19 minutes (the charging electricity is equivalent to 3% of the battery capacity) and idling for 12 hours was repeated. Herein, the remaining battery capacity is estimated to decrease as much as about 2% by a storing under an atmospheric temperature of 0° C.

for 12 hours. The intent to compensate the self-discharge quantity by the charging.

A2: A cycle of charging at a current of $1/10$ CmA under an atmospheric temperature of 0° C. for 38 minutes and idling for 12 hours, which corresponds to the charging method performed in the foregoing examples was repeated.

Herein, by fully discharging the battery until the battery voltage dropped to 1.0 V/cell for every 6 months, the discharge capacity of the battery was derived. The changes in the capacities are shown in FIG. 5.

Figure 5:
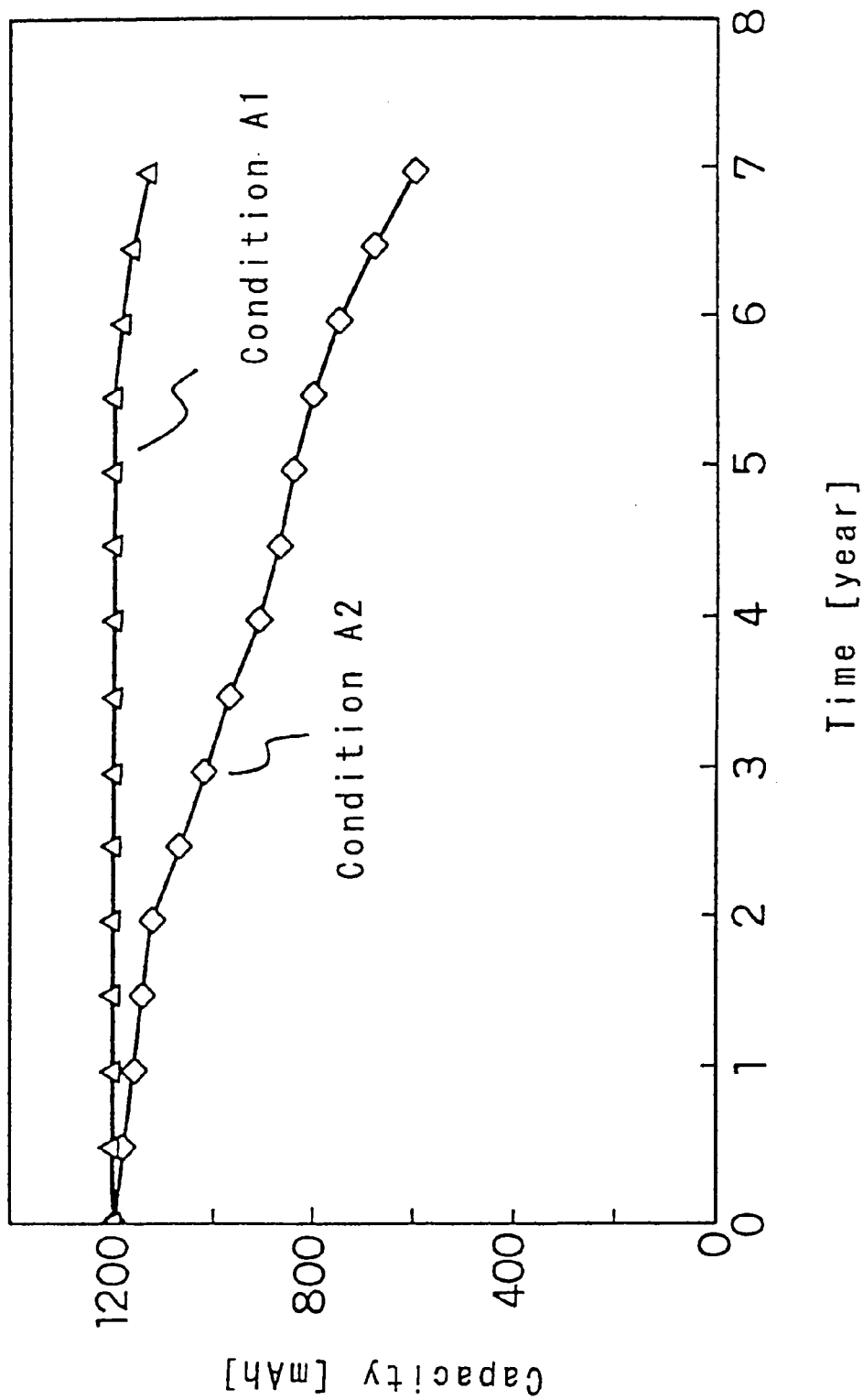
FIG. 5 is a characteristic diagram showing the changes in battery discharge capacities obtained by performing intermittent charges in two modes on a nickel-metal hydride storage battery in another example of the present invention.

As clearly shown in FIG. 5, the capacity of Battery Pack "A" which was charged under the condition "A2" decreased in the early stage as compared with Battery Pack "A" which was charged under the condition "A1".

It is presumed that under the condition "A1", the positive electrode was brought to the overcharged state by the charging condition commensurate with the self-discharge quantity estimated on the basis of the battery temperature, whereas under the condition "A2", the positive electrode was brought to the overcharged state and thus γ-type NiOOH is produced therein, thereby to raise the internal resistance of the battery and to decrease the discharge capacity thereof.

EXAMPLE 5

Battery Packs "A" similar to those used in the foregoing examples was charged intermittently under the following charging conditions "A3" and "A4", respectively.

A3: A cycle of charging at a current of $1/10$ CmA under an atmospheric temperature of 55° C. for 1 and ½ hours (the charging electricity is equivalent to 15% of the battery capacity) and idling for 12 hours was repeated. Herein, the remaining capacity is estimated to decrease as much as about 10% by a storing under an atmospheric temperature of 55° C. for 12 hours. The intent was to compensate the self-discharge quantity by the charging.

A4: A cycle of charging at a current of $1/10$ CmA under an atmosphere of 55° C. for 38 minutes (the charging electricity is equivalent to 6% of the battery capacity) and idling for 12 hours which corresponds to the charging method performed in the foregoing examples was repeated.

Herein, by fully discharging the battery until the battery voltage dropped to 1.0 V/cell for every 6 months, the discharge capacity of the battery were derived.

Figure 6:
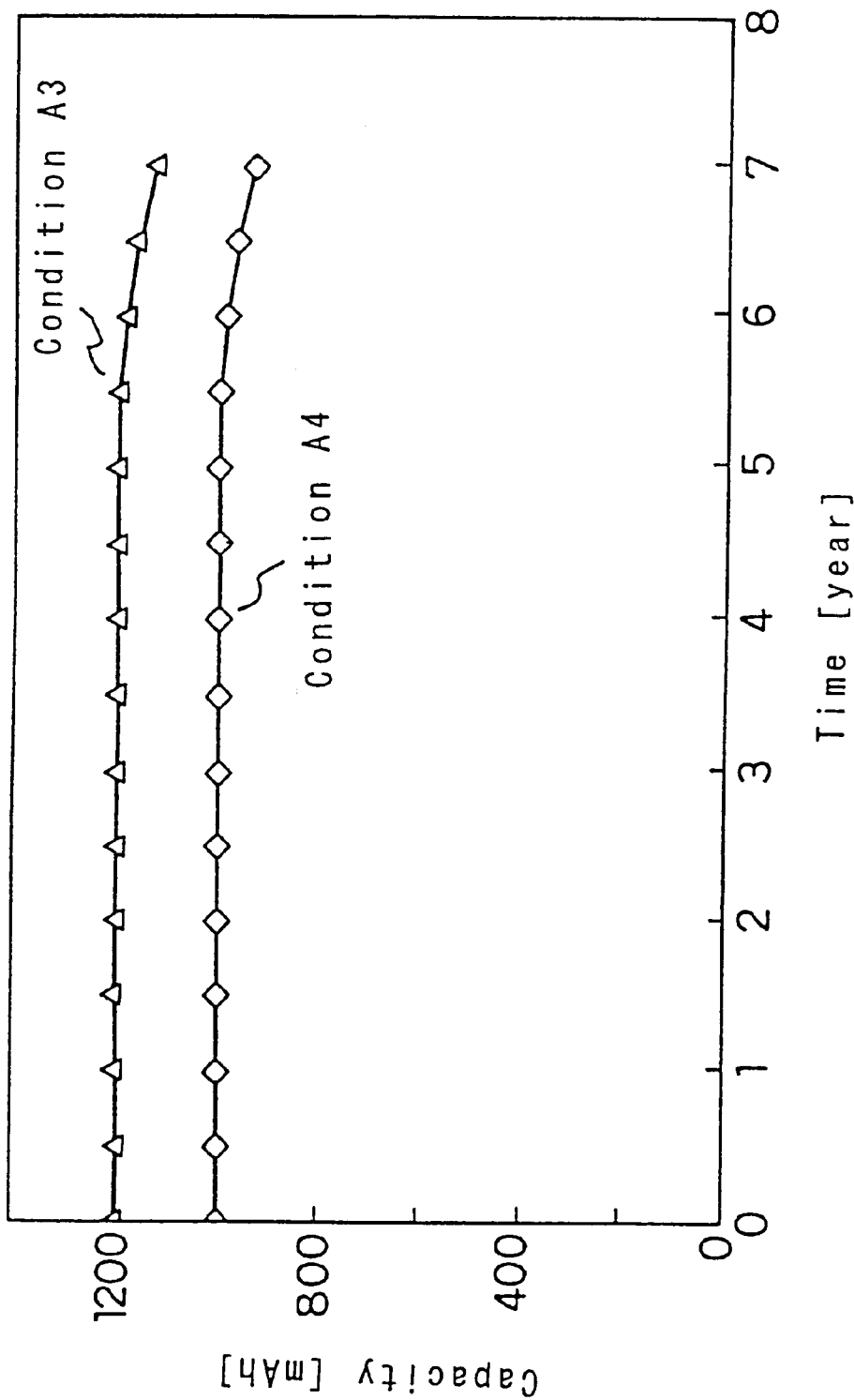
FIG. 6 is a characteristic diagram showing changes in battery discharge capacities obtained by performing intermittent charges in two modes on a nickel-metal hydride storage battery in still another example of the present invention.

The changes in the capacities are shown in FIG. 6. As clearly shown in FIG. 6, the capacity of Battery Pack "A" which was charged under the condition "A3" is larger than that of Battery Pack "A" which was charged under the condition "A4". This is because under the condition "A3", the positive electrode was brought to the fully charged state by being charged with that corresponds to the self-charge quantity derived from the battery temperature, thereby to maintain a satisfactory remaining capacity. In contrast, according to the condition "A4", it is presumed that the positive electrode was not brought to the fully charged state by being charged with only insufficient quantity which corresponds to the self-discharge at 25° C. which is smaller than the actual self-discharge quantity.

Incidentally, in the intermittent charge, it is preferable to charge at a current of $1/30$ C to 1 C. The idle period lasts, for instance, 3 hours to 7 days.

As above-described, in the intermittent charge of the nickel-metal hydride storage battery for the back-up power source, it is possible to improve a charging characteristic and cycle life characteristic over a wide temperature range, by charging the battery as much as the self-discharge quantity calculated on the basis of the battery temperature during the idle period in the charging.

EXAMPLE 6

In this example, a method of actually detecting the battery temperature and setting a charging condition on the basis of the detected battery temperature is described.

In this example, Battery Pack "A" similar to those used in the foregoing examples was used and the idle period was set to 72 hours.

An average temperature of the battery during 24 hours after the start of the idling was measured. Then, an average temperature of the battery during the next 24 hours, and an average temperature of the battery during the subsequent 24 hours were derived.

Figure 8:
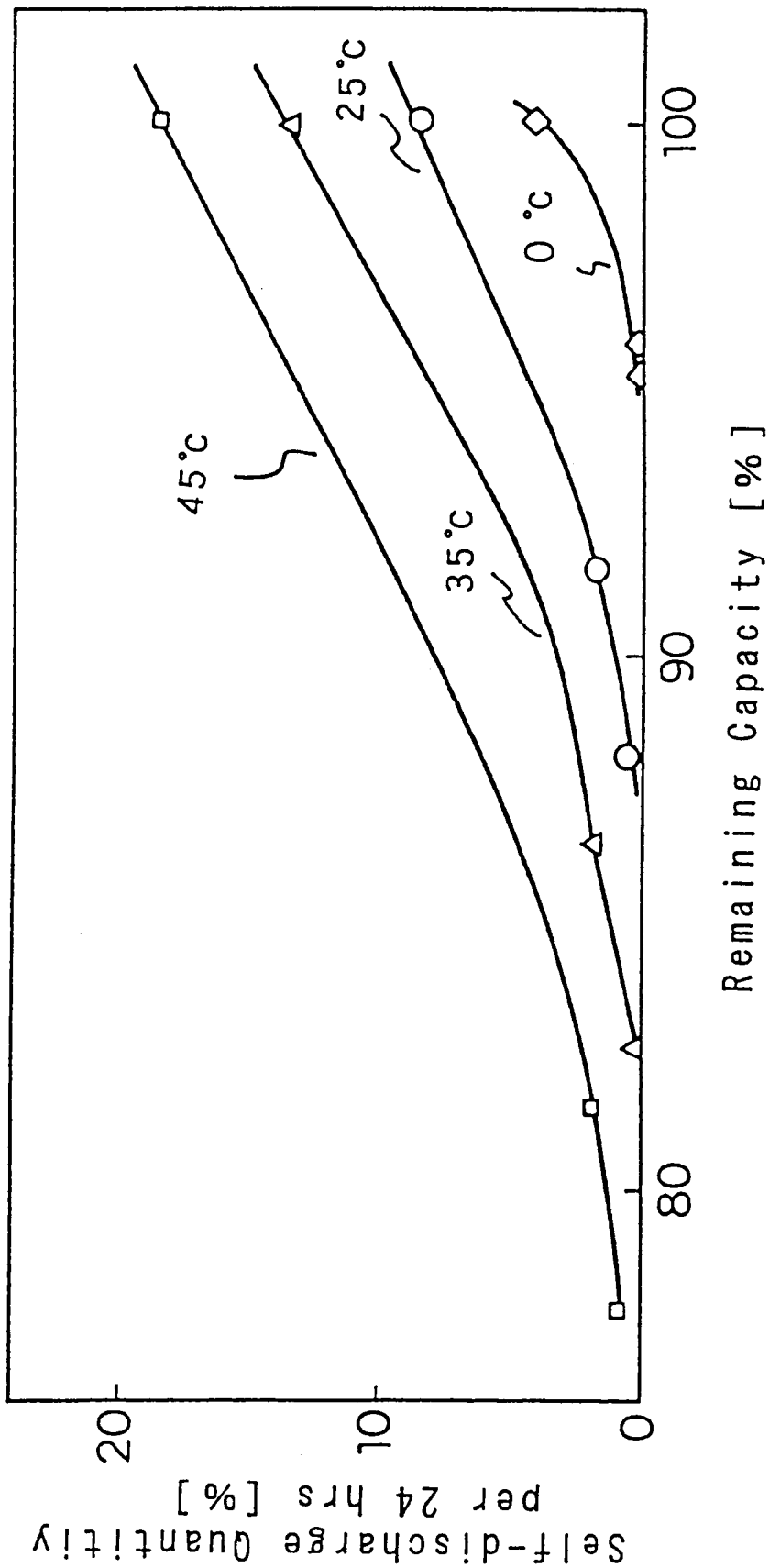
FIG. 8 is a characteristic diagram showing the relationships between remaining discharge capacities and self-discharge quantities of a nickel-metal hydride storage battery.

Herein, the remaining discharge capacities at the respective battery temperatures and the self-discharge quantities during the idling are, for instance, those shown in FIG. 8. It is therefore possible to derive a self-discharge quantity of a battery during the idling based on the information contained in FIG. 8.

Figure 7:
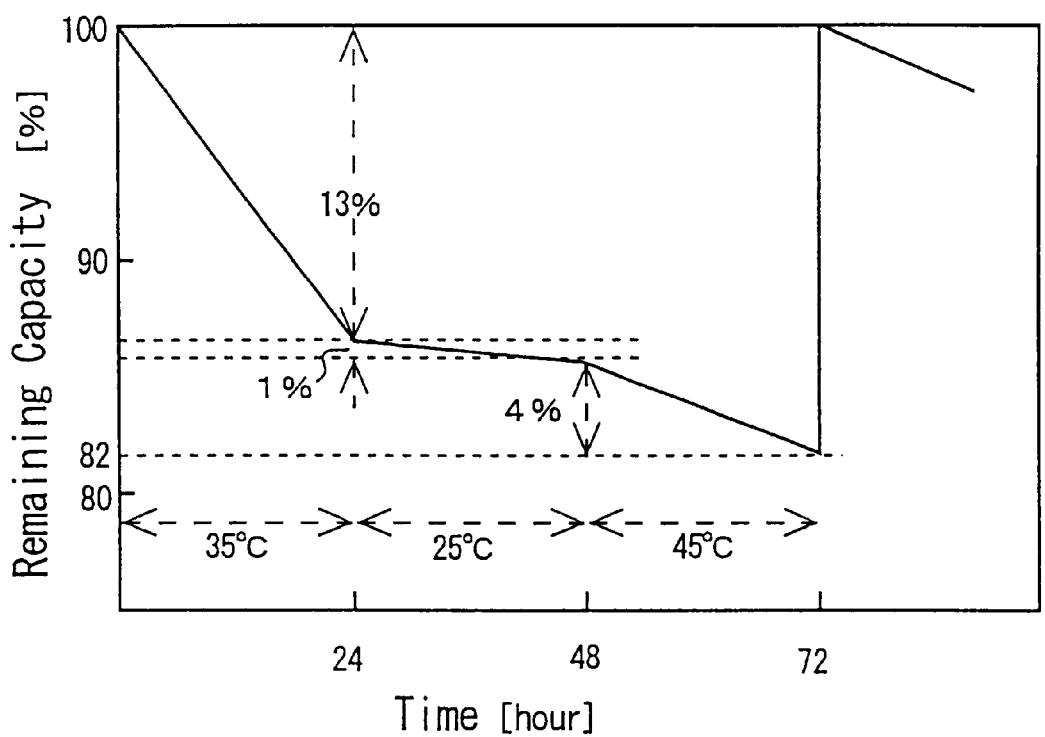
FIG. 7 is a mode diagram showing an outline of a method for managing the back-up power source in still another example of the present invention.

This is illustrated by the diagram in FIG. 7, whereby the average temperature of the battery during the first 24 hours immediately after the battery is fully charged (and after and the charging is stopped) is supposed to be 35° C., and the average temperatures of the battery during the next 24 hours and the subsequent 24 hours are supposed to be 25° C. and 45° C., respectively.

Based on the information contained in FIG. 8, the self-discharge quantity of the battery during the first 24 hours where the battery average temperature is 35° C. is 13%. The self-discharge quantity of the battery during the next 24 hours (the battery average temperature is 25° C.) is 1% because the remaining battery capacity is 87%. The self-discharge quantity of the battery during the subsequent 24 hours (the battery average temperature is 45° C.) is 4% because the remaining battery capacity is 86%.

When these quantities are accumulated, the self-discharge quantity of the battery during the idle period of 72 hours is to 18%. Therefore, when the battery is then charged with a quantity as much as that which corresponds to the self-discharge quantity calculated in this manner, the battery can be brought to the fully charged state. Thus, the time period for the subsequent charging immediately after the idle period is determined on the basis of this self-discharge quantity.

As previously described, by measuring the battery temperature and determining the subsequent charging condition, it is possible to reduce the degree in deterioration of the nickel-metal hydride storage battery due to the overcharging. In particular, by dividing the idle period into a plurality of periods and deriving each of the self-discharge quantities on the basis of the average temperatures in the periods for every such periods, it is possible to maintain the battery capacity for a long time even if the battery temperature and the atmospheric temperature vary.

In the following few paragraphs, an example of this charge control method is described.

For Battery Packs "A" and "B" used in Example 1, the self-discharge quantities of the battery packs were calculated by setting the idle period to 24 hours and by being based on the average battery temperatures during 12 hours of the former half and 12 hours of the latter half of the idle period, in a manner similar to those described above. Next, the battery pack was charged at a current of $1/10$ CmA for a time period so determined as to compensate the accumulated self-discharge quantity.

While repeating the above-mentioned cycle, the battery packs were fully discharged until the battery voltages dropped to 1.0 V/cell for every 6 months, to derive the battery capacities. The changes in the battery capacities are plotted in FIG. 9.

Figure 9:
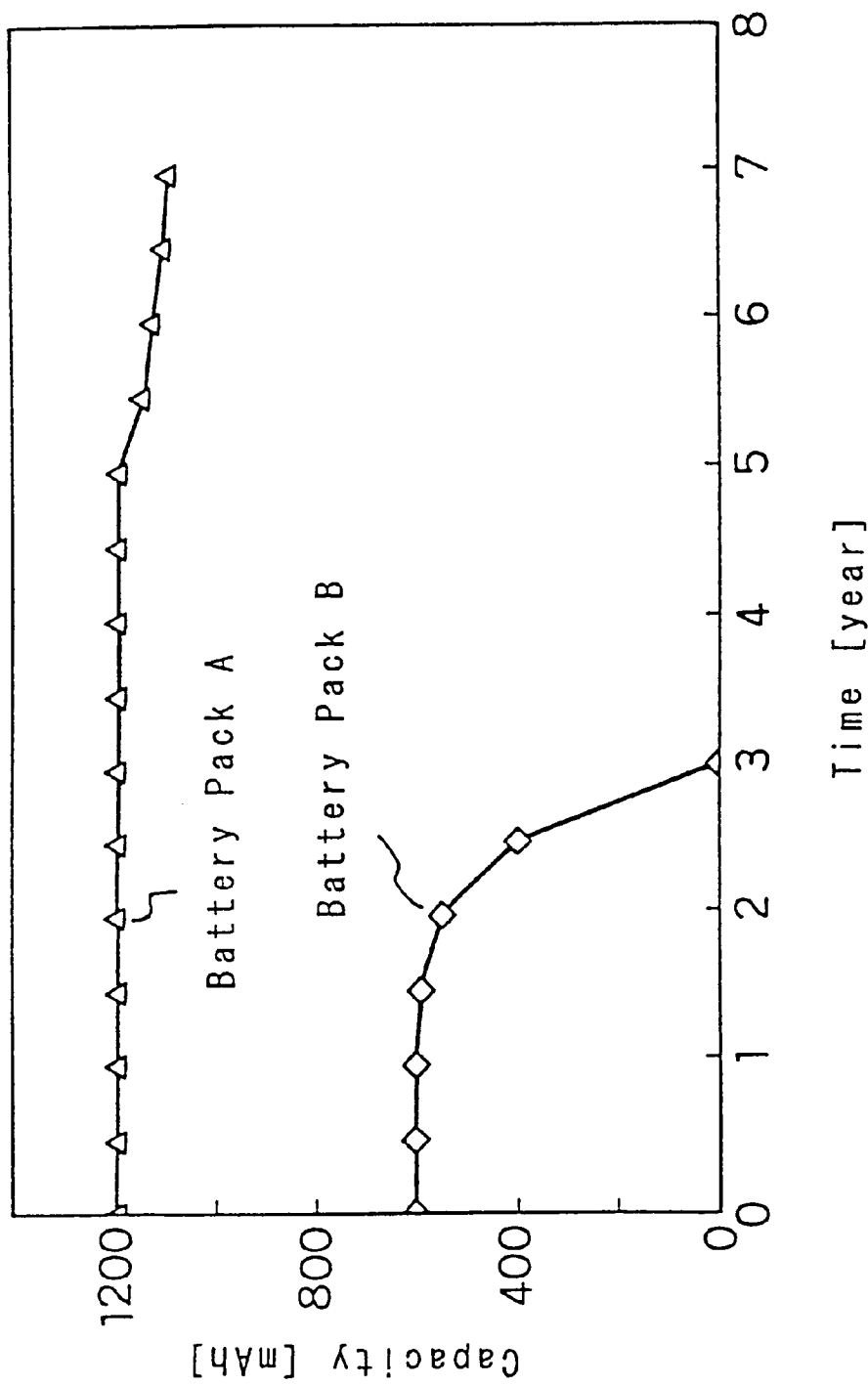
FIG. 9 is a characteristic diagram showing changes in battery discharge capacities obtained by performing an intermittent charge on a nickel-metal hydride storage battery in another example of the present invention.

As clearly shown in FIG. 9, the capacity of Battery Pack "B" with the nickel-cadmium storage batteries decreases in the early stage whereas the capacity of Battery Pack "A" with the nickel-metal hydride storage batteries is maintained for a long-term.

The idle period need not be set to 24 hours as in this example, but preferably should be set to 3 hours to 7 days.

Further, the period for deriving an average temperature of the battery need not necessarily be set to 12 hours as in this example, but preferably should be set to 3 hours to 48 hours.

In addition, the current at charging need not necessary be set to 1/10 C, but preferably should be set to 1/30 C to 1 C.

As previously described, with regard to the charging operation of the nickel-metal hydride storage battery for the back-up power source, it is possible to improve the charging characteristic and cycle life characteristic over a wide temperature range, by dividing the idle period into a plurality of given periods, calculating the remaining capacity of the battery on the basis of the average battery temperatures during the divided respective periods, and compensating the quantity which corresponds to the self-discharge by the subsequent charging.

EXAMPLE 7

Battery Packs "C" and "D" were configured by connecting each 6 pieces of the nickel-metal hydride storage batteries in series, respectively.

An intermittent charging was performed on each of Battery Packs "C" and "D" thus obtained under an atmosphere of 0° C. in the following modes.

For Battery Pack "C", the self-discharge quantity of the battery pack was calculated on the basis of the average battery temperatures of the battery pack during the respective time periods in the idle period divided for every 24 hours. When the accumulated value of the calculated self-discharge quantity reaches 20% of the battery capacity, the battery pack was charged with that which corresponds to the self-discharge quantity at a current of 1/10 CmA, intermittently.

On the other hand, Battery Pack "D" was subjected to a repetition of the idling for 12 hours and the charging at a current of 1/10 CmA for 38 minutes (which corresponds to 6% of the battery capacity) in a manner similar to Battery Pack "A" of Example 6. While repeating the above-mentioned cycle, the battery packs were fully discharged until the battery voltages dropped to 1.0 V/cell for every 6 months, to measure the battery capacities.

Figure 10:
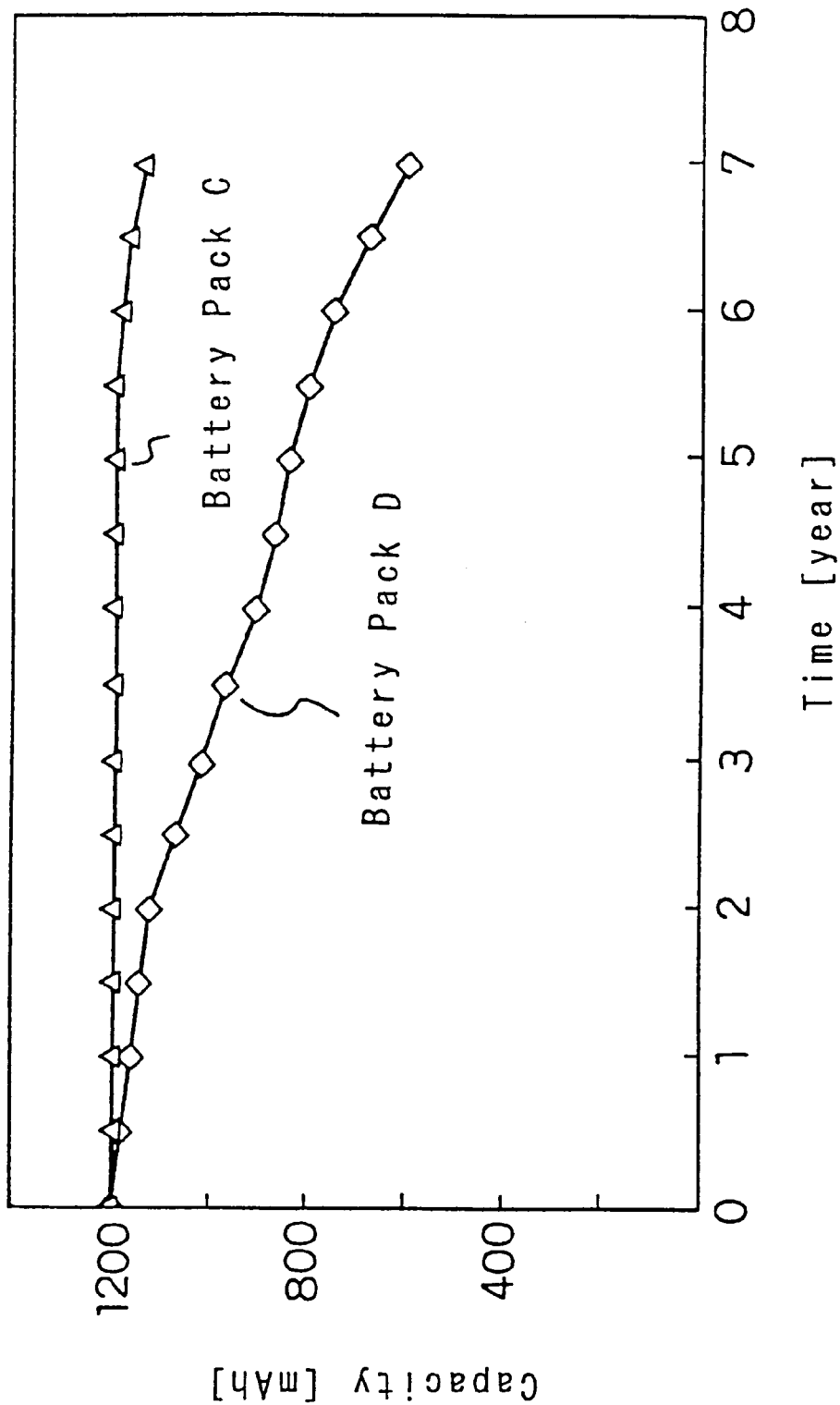
FIG. 10 is a characteristic diagram showing changes in battery discharge capacities obtained by performing an intermittent charge on a nickel-metal hydride storage battery in a further example of the present invention.

The relationships between the charging periods and the battery capacities are plotted in FIG. 10.

As clearly shown in FIG. 10, Battery Pack "C" maintained the capacity for a long period in comparisom with Battery Pack "D". More specifically, it is presumed that in Battery Pack "C", the positive electrodes were not brought to the overcharged state by the intermittent charge designed by considering the effect of the self-discharge by the temperature, whereas Battery Pack "D" is brought to the overcharged state and γ-type NiOOH is formed at the positive electrode thereof by being charged with a self-discharge quantity at 25° C. which is larger than the actual self-discharge quantity, thereby to decrease the discharge capacity.

EXAMPLE 8

Battery Packs "E" and "F" were configured by connecting each 6 pieces of the nickel-metal hydride storage batteries in series, respectively.

An intermittent charge was performed on each of Battery Packs "E" and "F" thus obtained under an atmosphere of 25° C. in the following modes.

For Battery Pack "E", the self-discharge quantity of the battery pack was calculated on the basis of the average battery temperatures of the battery pack measured during the respective time periods in the idle period divided for each 24 hours. When the accumulated value of the calculated self-discharge quantities reaches 20% of the battery capacity, the battery pack was charged with that corresponds to the self-discharge quantity at a current of 1/10 CmA, intermittently.

On the other hand, Battery Pack "F" was subjected to a repetition of the idling for 12 hours and the charging at a current of 1/10 CmA for 38 minutes (the charging electricity corresponds to 6% of the battery capacity) in a manner similar to Battery Pack "A" of Example 6. While repeating the above-mentioned cycle, the battery packs were fully discharged until the battery voltages dropped to 1.0 V/cell for every 6 months, thereby to measure the battery capacities.

Figure 11:
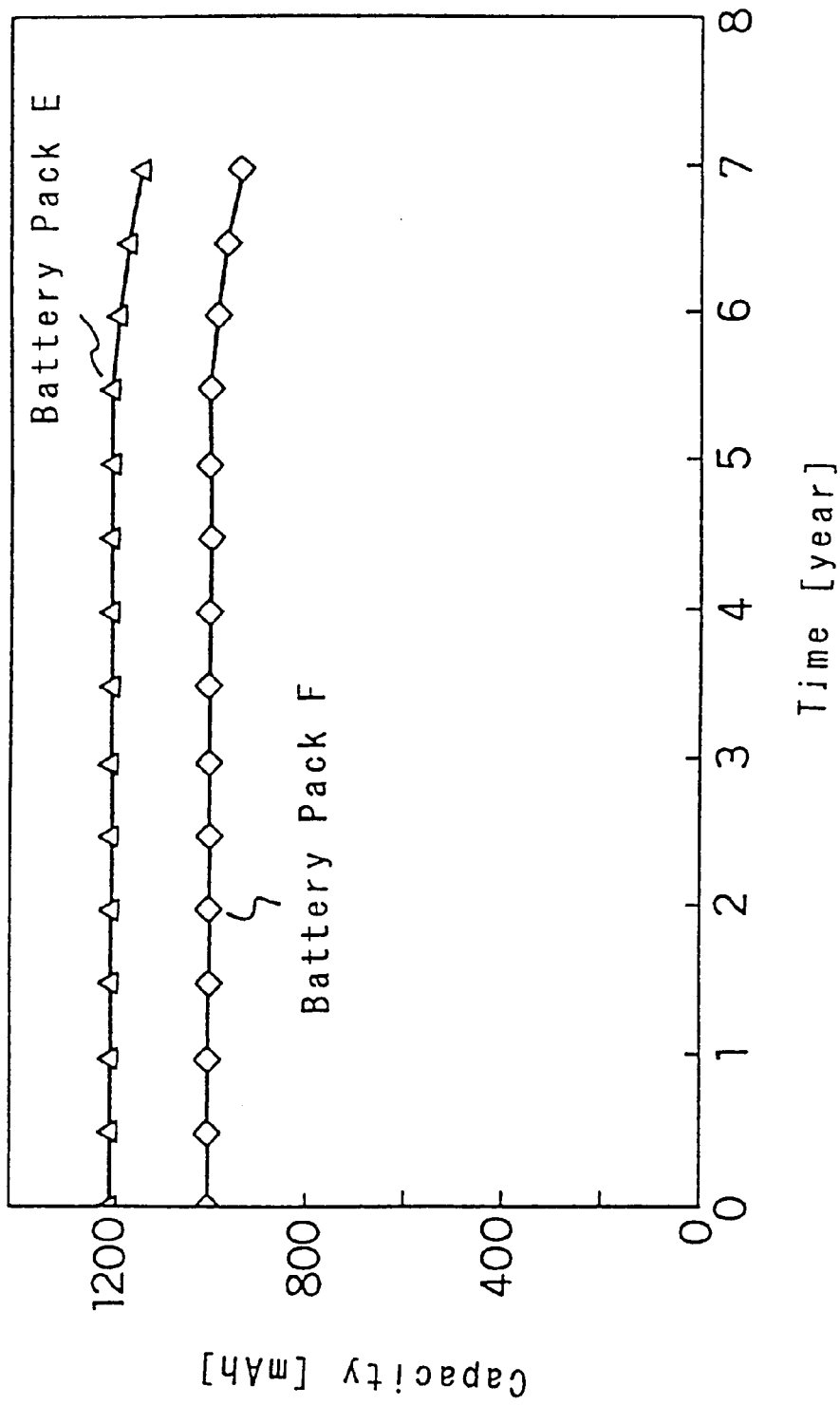
FIG. 11 is a characteristic diagram showing changes in the battery discharge capacities obtained by performing an intermittent charge on a nickel-metal hydride storage battery in another example of the present invention.

The relationships between the charging periods and the battery capacities are plotted in FIG. 11.

As clearly shown in FIG. 11, Battery Pack "E" maintained the capacity for a longer period in comparison with Battery Pack "F". More specifically, it is presumed that Battery Pack "E" has been fully charged by the intermittent charge designed while considering the effect of the self-discharge by the temperature, whereas in Battery Pack "F", the battery capacity has decreased by the insufficient charging.

EXAMPLE 9

In this example, a method for determining the degree in the deterioration of the battery while using the intermittent charge will be described.

A paste consisting mainly of a nickel hydroxide powder and a cobalt compound powder as a conductive agent was prepared. Next, the obtained paste was filled in a substrate of foamed nickel. The substrate filled with the paste was pressed to have a predetermined thickness and cut into a size for a battery of AA size, to produce a positive electrode plate.

On the other hand, a paste consisting mainly of a hydrogen storage alloy ($MmNi_5$-type) powder was applied on the both side faces of a substrate of a perforated Ni-plated steel sheet. After pressing the Ni-plated steel sheet, it was cut into the predetermined size thereby to produce a negative electrode plate.

Thus obtained positive and negative electrodes are laminated each other via a separator of a polypropylene non-woven fabric interposed therebetween. Then the laminated sheets were wound up together in a spiral fashion, thereby to produce an electrode group. The obtained electrode group is inserted into an exterior can, and a predetermined amount of an alkaline electrolyte prepared by dissolving lithium hydroxide in an aqueous solution of KOH having a specific gravity of 1.30, at 30 g/L was also injected into the exterior can. The can was stood still under an atmosphere of 25° C. for 12 hours and then subjected to an initial charge/discharge (charging at a current of 0.1 C for 15 hours, and discharging at a current of 0.2 C for 4 hours), to produce a nickel-metal hydride storage battery of AA size having a nominal discharge capacity of 1200 mAh.

Figure 12:
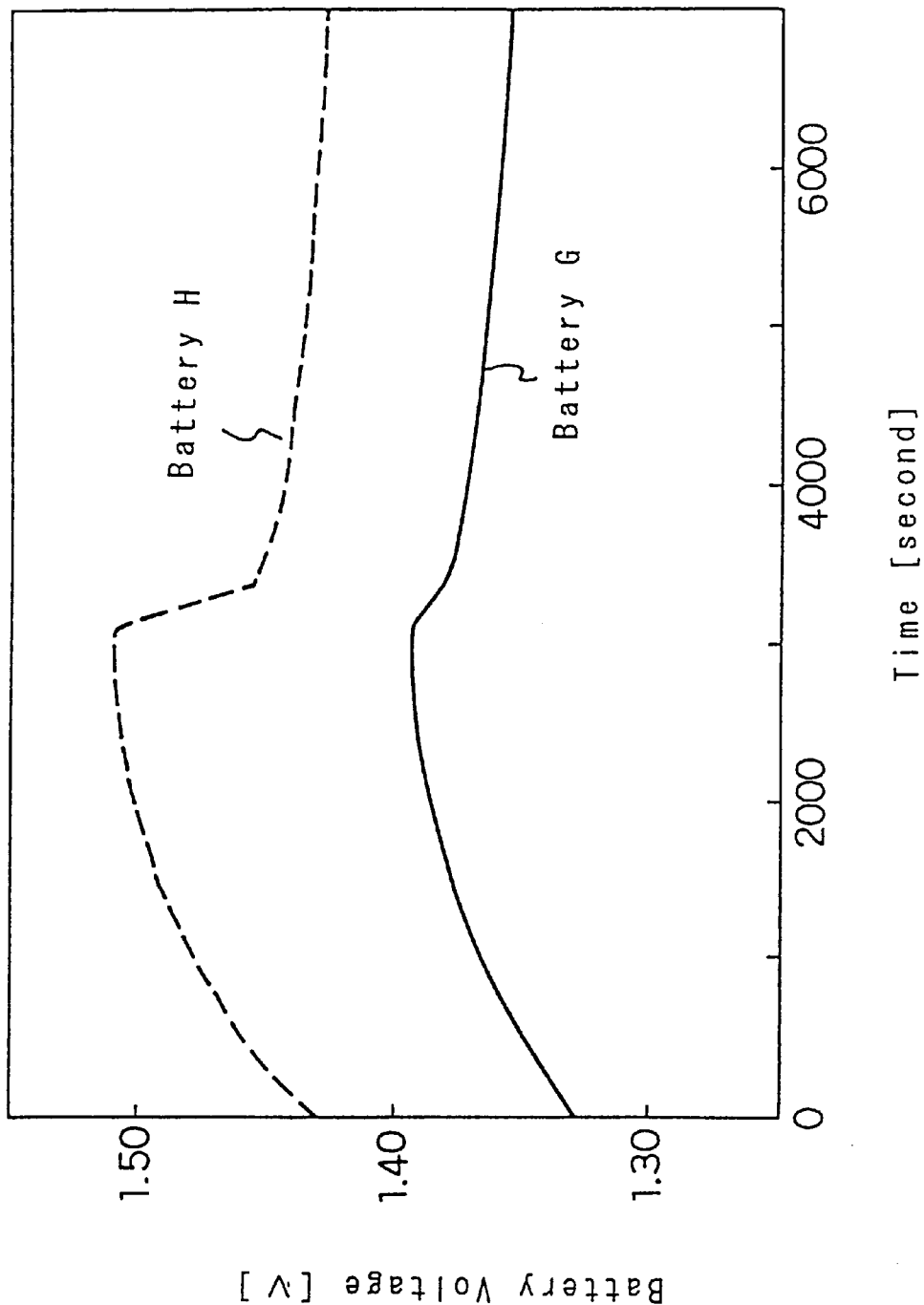
FIG. 12 is a characteristic diagram showing voltage behavior appeared by performing an intermittent charge on a nickel-metal hydride storage battery in a further example of the present invention.

The voltage behavior of the nickel-metal hydride storage battery produced in the above-mentioned manner during an intermittent charge immediately after the initial charge (an internal impedance of 16.1 mΩ), and the voltage behavior of the same battery after a cycle life test (internal impedance of 161 mΩ) under a repetition of 400 cycles of charge/discharge (charging at a current of 1 CmA under an atmosphere of 40° C. up to 120% of the nominal capacity, and discharging at a current of 1 CmA until the terminal voltage dropped to 1 V) during an intermittent charging are shown in FIG. 12. In this diagram, Battery "G" represents the nickel-metal hydride storage battery immediately after the initial charge and Battery "H" represents the nickel-metal hydride storage battery after the completion of the cycle life test of 400 cycles. Herein, both batteries were charged at a current of 0.1 CmA under an atmosphere of 35° C. As shown, the battery "H" exhibits a higher voltage at the completion of charging than battery "G" by about 0.1 V. Although the difference in the voltage at the completion of charging was small because the test is on a single cell, the difference in the voltage was larger in the back-up power sources of actual uses for the guidance lights, the emergency lights, the information telecommunication systems and the like, which have with a plurality of the single cells, and enable the determination of the degree in the deterioration with ease.

Figure 13:
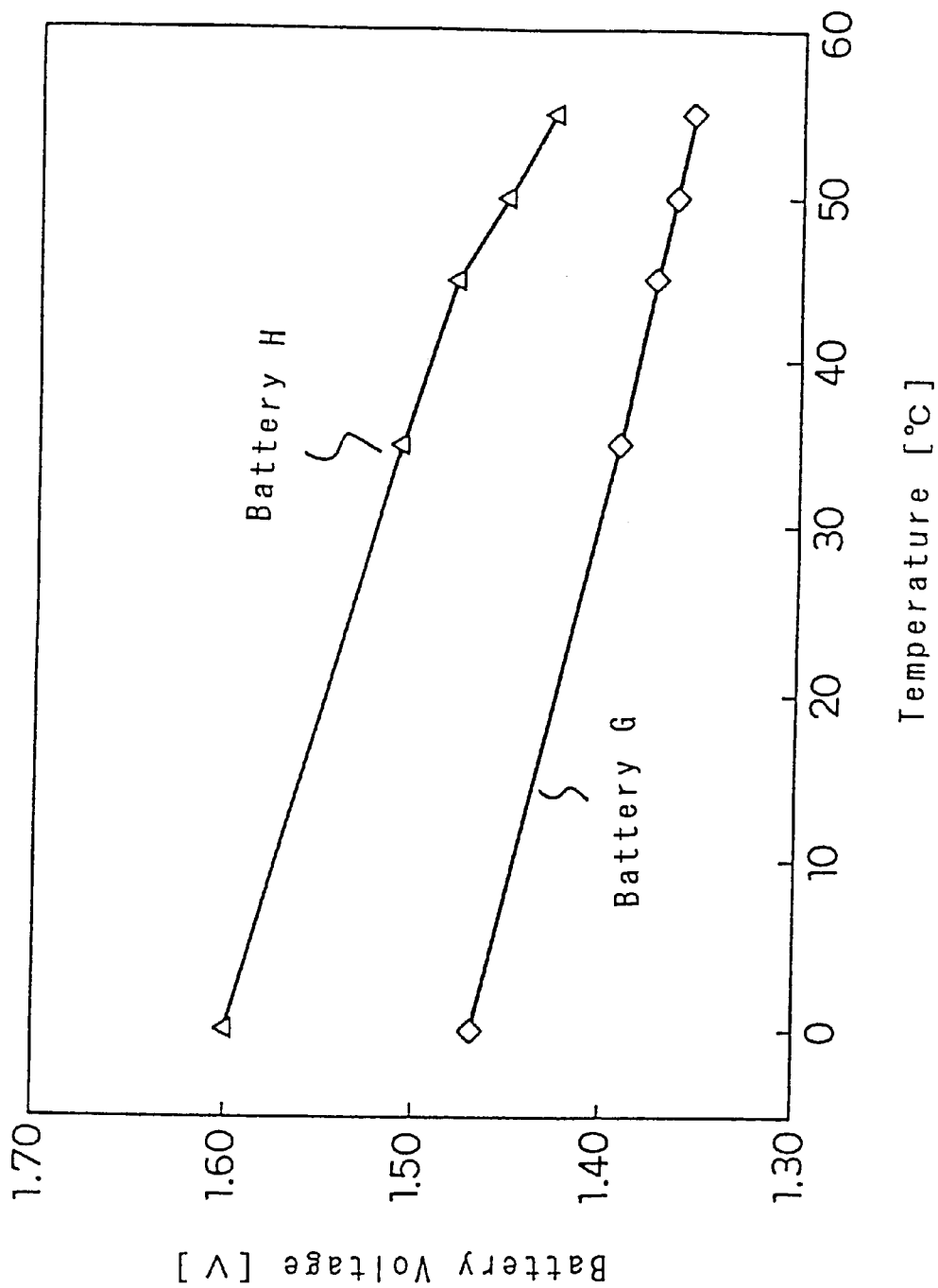
FIG. 13 is a characteristic diagram showing relationships between the battery temperatures at the start of charging and battery voltages at the finishing of the charging.

In addition, by using the above-mentioned Battery "G" and Battery "H", the relationships between the battery temperatures at the start of the charging and the battery voltages at the completion of the charging are derived. The results thereof are shown by the diagram in FIG. 13.

As described above, detections of battery temperature at the start of the charging and that of battery voltage at the completion of the charging enable a determination of the degree in detrioration of the battery.

The accuracy of such determination is improved by continuously monitoring the temperature and voltage of the battery under an intermittent charge.

According to the present invention, it is possible to maintain the discharge capacity of the nickel-metal hydride storage battery for a long-term, and to provide a method for managing a power source apparatus which is suitable for the management of the back-up power sources for the guidance lights, the emergency lightings, the information telecommunication systems and the like.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for managing a back-up power source which uses a nickel metal-hydride storage battery including a positive electrode mainly consisting of nickel oxide, a negative electrode mainly consisting of a hydrogen storage alloy, a separator and an alkaline electrolyte, wherein intermittent charging is performed on said nickel metal-hydride storage battery, comprising:

calculating a self-discharge quantity of said nickel metal-hydride storage battery during an idling period of said intermittent charging on the basis of an average temperature of said nickel metal-hydride storage battery during a first period in the idling period;

controlling the charging of said nickel metal-hydride storage battery on the basis of the obtained self-charged quantity when the self-discharged quantity reaches a predetermined value;

calculating the self-discharge quantity of said nickel metal-hydride storage battery during a second period subsequent to the first period on the basis of an average temperature of said nickel metal-hydride storage battery during the second period when the obtained self-discharge quantity does not reach said predetermined value, and an accumulated value of the calculated self-discharged quantities of each of the first and the second periods is compared with said predetermined value; and restoring charging when the calculated self-discharge quantity reaches the predetermined value.

2. The method for managing the back-up power source in accordance with claim 1, wherein a subsequent charge period is based on the calculated self-discharge quantity.

3. The method for managing the back-up power source in accordance with claim 1, wherein said predetermined value is in a range of 10% to 30% of the discharge capacity of said nickel metal-hydride storage battery.

4. The method for managing the back-up power source in accordance with claim 1, wherein said first period is from 3 hours to 48 hours.

* * * * *